(12) United States Patent
Magielse et al.

(10) Patent No.: US 11,233,854 B2
(45) Date of Patent: Jan. 25, 2022

(54) LIGHTING CONTROL DATA IDENTIFICATION

(71) Applicant: SIGNIFY HOLDING B.V., Eindhoven (NL)

(72) Inventors: Remco Magielse, Tilburg (NL); Bingzhou Chen, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/077,894

(22) PCT Filed: Feb. 8, 2017

(86) PCT No.: PCT/EP2017/052698
§ 371 (c)(1),
(2) Date: Aug. 14, 2018

(87) PCT Pub. No.: WO2017/137413
PCT Pub. Date: Aug. 17, 2017

(65) Prior Publication Data
US 2019/0058765 A1 Feb. 21, 2019

(30) Foreign Application Priority Data

Feb. 14, 2016 (WO) ................ PCT/CN2016/073761
Apr. 4, 2016 (EP) ..................... 16163627

(51) Int. Cl.
| H04L 29/08 | (2006.01) |
| G06F 8/60 | (2018.01) |
| H04L 12/28 | (2006.01) |
| H05B 47/175 | (2020.01) |
| G06F 9/54 | (2006.01) |

(52) U.S. Cl.
CPC .............. *H04L 67/125* (2013.01); *G06F 8/60* (2013.01); *G06F 9/547* (2013.01); *H04L 12/282* (2013.01); *H04L 12/2816* (2013.01); *H04L 12/2832* (2013.01); *H04L 67/34* (2013.01);
(Continued)

(58) Field of Classification Search
None
See application file for complete search history.

(56) References Cited

U.S. PATENT DOCUMENTS

| 2010/0094439 A1 | 4/2010 | Van De Meulenhof et al. |
| 2011/0140832 A1 | 6/2011 | Vinkenvleugel et al. |

(Continued)

FOREIGN PATENT DOCUMENTS

| CN | 103052200 A | 4/2013 |
| CN | 104427715 A | 3/2015 |

(Continued)

*Primary Examiner* — Charles E Anya

(57) ABSTRACT

A networked lighting system is provided which stores, e.g. in a lighting controller node, lighting control data such as scenes or rules based on receiving such data from an application running on a first computer device. An identification of the application which lighting control data was received from is stored alongside this data. When an input is received by (a node in) the networked lighting system from an application running on a second computer device indicating that the lighting control data is to be edited, an application call is executed such that the application the lighting control data was received from is run on this second computer device.

20 Claims, 3 Drawing Sheets

(52) U.S. Cl.
CPC ...... *H05B 47/175* (2020.01); *H04L 2012/285* (2013.01); *H04L 2012/2841* (2013.01)

(56) References Cited

U.S. PATENT DOCUMENTS

| | | | |
|---|---|---|---|
| 2012/0242254 A1* | 9/2012 | Kim | H05B 37/0254 |
| | | | 315/312 |
| 2014/0049166 A1 | 2/2014 | Yoon | |
| 2014/0070919 A1* | 3/2014 | Jackson | G08C 17/02 |
| | | | 340/5.61 |
| 2014/0244063 A1* | 8/2014 | Davis | H05B 37/0272 |
| | | | 700/297 |
| 2015/0137698 A1 | 5/2015 | Kim et al. | |
| 2015/0163888 A1* | 6/2015 | Fredricks | H05B 37/0272 |
| | | | 119/51.04 |
| 2015/0201480 A1* | 7/2015 | Ogawa | H05B 47/19 |
| | | | 315/294 |
| 2015/0287110 A1* | 10/2015 | Paolini | G06Q 30/0641 |
| | | | 705/26.1 |
| 2015/0309516 A1* | 10/2015 | Williams | G05D 23/1904 |
| | | | 700/278 |
| 2016/0037611 A1* | 2/2016 | Min | H05B 33/0842 |
| | | | 315/152 |

FOREIGN PATENT DOCUMENTS

| | | |
|---|---|---|
| CN | 104780654 A | 7/2015 |
| CN | 104823523 A | 8/2015 |
| JP | 2012529107 A | 11/2012 |
| JP | 2015069050 A | 4/2015 |
| WO | 2009109980 A2 | 9/2009 |

\* cited by examiner

LIGHTING CONTROL DATA IDENTIFICATION

CROSS-REFERENCE TO PRIOR APPLICATIONS

This application is the U.S. National Phase application under 35 U.S.C. § 371 of International Application No. PCT/EP2017/052698, filed on Feb. 8, 2017, which claims the benefit of International Application No. PCT/CN2016/073761, filed on Feb. 14, 2016 and European Patent Application No. 16163627.9, filed on Apr. 4, 2016. These applications are hereby incorporated by reference herein.

FIELD OF THE INVENTION

The invention generally relates to a method for controlling a networked lighting system and in particular to editing control data for controlling such a networked lighting system. The invention further relates to a computer program product for performing the method, to a node in a networked lighting system and to a system.

BACKGROUND OF THE INVENTION

Networked lighting devices offer advanced control options, such as scene setting and rule based control. A user can access such control options via a remote control device, such as a smart phone. Scene data can be stored on the smart phone and/or on a node in a networked lighting system, such as in a memory of the networked lighting device. Storing scene data on a node in the lighting system, such as on a networked lighting device, allows a scene recall to be performed without having access to the application that was used to create the scene.

From US 2011/140832 A1 it is known to have a system with multiple remote controls, where lighting scene data is synchronized such that all remote controls have the current scene data.

Publication WO 2009/109980 A2 relates to a method for transferring an application running on a second device to a first device, by determining an application version compatible with the first device (based on device information related to the first device) and the second device obtaining said application version before transferring said application to the first device.

Storing scene data on the smart phone requires access to the application to set the scene, yet allows easy editing of the scene based on data stored on the smart phone. Storing the scene both on a node and on the smart phone can provide both benefits but has undesirable consequences, such as requiring more memory in the overall system and requiring synchronization between related scenes stored in various locations. It is desirable to provide control options for networked lighting systems that combine one or more of the aforementioned advantages with fewer or none of the aforementioned disadvantages.

SUMMARY OF THE INVENTION

The inventors have realized that lighting control data stored in a networked lighting system provides various benefits, such as: autonomous execution of rules, scene recall, etc. For example, when a networked lighting system can autonomously execute a rule that a user has programmed via an application on a smart phone, the application need not be active for the rule to be triggered. When a user sets an alarm causing a bedroom light to turn on at a certain time, it is undesirable if this requires the application for setting the alarm to be running on the smart phone at the time the alarm is set to go off. As a further example, a scene that is set by a user using an application on a smart phone can be stored on the smart phone. When a user can only recall that scene using the specific phone the scene is stored on, this is undesirable in view of, for example, other users of the same networked lighting system lacking access to that same scene via their own smart phones.

At the same time, the inventors have realized that storing lighting control data on, for example, the smart phone having the application that was used to generate the data allows a user to easily edit the lighting control data later on. As an example, a user having selected an intensity of light to be emitted by a networked lighting device may want to change this setting. It is desirable to be able to access, review and change this setting in the same application that was used to initially set it in.

In a first aspect, a method is provided for controlling, based on lighting control data, a networked lighting system. Lighting control data is received from an application running on a first computer device. In a node of the networked lighting system a data set is stored. The data set is based on the lighting control data and comprises identification data identifying the application which the lighting control data was created with. When from an application running on a second computer device an input indicating an editing of the lighting control data is received, the identification data comprised in the data set which is based on the lighting control data is retrieved. An application call is executed based on the retrieved identification data, such that the second computer device runs the application which the lighting control data was created with.

The computer implemented method allows lighting control data to be stored in the networked lighting system, such as in a lighting node or a hub, bridge or controller node. This is beneficial as it supports the lighting control data to be accessed by other nodes in the system. For example, if the lighting control data is a scene describing light output of one or more lighting nodes, then the scene can be recalled not only by the computer device running the application that was used to create it. It can then, continuing the example, be recalled by a properly configured wall switch node in the networked lighting system. As a further example, if the lighting control data is a rule related to setting a scene at a specific time of day, then the scene can be recalled at the appropriate time by executing the rule by a node in the networked lighting system. This can alleviate the need for the computer device, such as a smart phone, running the application that has set the rule to be connected to the networked lighting system when the rule is triggered to set the scene.

Receiving lighting control data from an application running on a first computer device can comprise the application on the first computer device performing an application programming interface (API) call to an API running on a node in the networked lighting system. The first computer device can be a smart phone connected to a network to which the node running the API service is connected as well. Such a call can comprise the lighting control data, such as a command for setting a romantic scene comprising all lamps emitting red light, or a reference to lighting control data, such as a uniform resource locator (URL) to a location from which to download a scene.

The data set is stored in a node of the networked lighting system. For example, the data set can be stored in a lighting node or a hub, bridge or controller node of the networked lighting system. Although the data set will be stored in at least one node, the data set or different versions of the data set can be stored in multiple nodes. For example, the romantic scene setting two out of three lamps to red can be stored in the two lighting nodes that emit light to contribute to this specific scene. The data stored in each of these two lighting nodes then relates to the light output of that specific node for that specific scene. When the romantic scene is to be set in the networked lighting system, a scene command can then be sent to all nodes in the networked lighting system and those nodes that have a role in creating the scene can in their own local memory look up what their light output should be in that scene. This can be beneficial as it allows for fast scene recall, as it is not necessary to address individual lamps and/or transmit specific light settings when a scene is recalled.

The data set that is stored in the node is based on the lighting control data. The format used for storage need not be the same as the format in which the lighting control data is received from the first computer device. If the data set is stored on multiple nodes, the format used and/or the content of the data set can, but need not, vary for each node. The data set comprises identification data identifying the application which the lighting control data was created with. Examples of such identification data are a name of the application, a URL linking to (data related to) the application, a number identifying the application, etc. This data can, for example, be received from the application, can be determined based on the format of the lighting control data as it is received, can be received from a server that stores associated applications or can be determined based on the computer device from which the control data is received (e.g. a wall panel exclusively running one application).

An input indicating an editing of the lighting control data received from an application running on a second computer device can, for example, be a selection of a specific rule or scene. A user may use an application to view which scenes and rules are stored in the networked lighting system. This application running on the second computer device can be the same as the application running on the first computer device. The first and the second computer device can be the same computer device, but need not be (and in an embodiment the first and the second computer device are not the same computer device). As an example only, the first computer device may be a first smart phone used by a first user and the second computer device can be a second smart phone used by a second user. When the first user then uses a first application to create and store a scene, the second user can then open a second application to view the scenes stored in the networked lighting system and select one using a second application. If the second application is a different application than the first application, the first application would then be called on the second smart phone such that the second user can edit the scene in the application it was created with.

In an embodiment of the computer implemented method according to the first aspect, the method further comprises: receiving further data from the application from which the lighting control data is received, and providing to the second computer device the further data, such that the application which the lighting control data was created with provides a user interface based on the further data for editing the lighting control data, wherein the data set comprises the further data. As an example, the lighting control data can comprise a color setting and/or an intensity setting for controlling a light output of a networked lighting device, the setting acquired from an image; and the further data comprises a reference to the image or the further data comprises the image. Optionally, the further data further comprises at least one position in the image from which the setting was acquired. As another example, the lighting control data comprises a rule for controlling a light output of a networked lighting device, the rule based on a template, and the further data comprises a reference to the template or wherein the further data comprises the template. Optionally, the rule comprises multiple rule elements and wherein the further data further comprises a mapping of at least some of the multiple rule elements to the template. This is advantageous as it supports, as an example, a scenario in which a user uses a first application to pick colors from an image to create a scene. The scene, i.e. the lighting control data, is then stored in the networked lighting system. The image from which the colors were picked is then also stored in the networked lighting system, or a URL is stored to a download location of the image. When the user then wishes to edit the scene (e.g. pick different colors), the application that was used to pick the colors in the image can be called and the application can open the image that was used to pick the colors of the scene.

A first set of examples of how to execute an application call is: the second application calling the application which the lighting control data was created with on the second computer device based on the identification data, or a node in the networked lighting system calling the application which the lighting control data was created with on the second computer device based on the identification data. Optionally, executing the application call further comprises: determining that the application which the lighting control data was created with is not installed on the second computer device, and controlling the second computer device to download a copy of the application which the lighting control data was created with (e.g. if it is stored locally or the download location is known to the second computer device) or, if needed, providing the identification data to an internet service to determine a download location of the copy of the application which the lighting control data was created with.

This is beneficial, for example, when a user has created a scene and stored that scene in the networked lighting system using a first application and has consequently deleted that first application. When the user then indicates through a second application that a scene is to be edited, this can trigger a download of the first application such that this first application is opened and the user can edit the scene in the application it was created with. As a further example, a scene may have been created using an application that is no longer available or is not supported for the platform of the smart phone the user is currently using. Where it is stated here that the application that is run on the second computer device for editing the lighting control data is the same application that was used for creating the lighting control data, such can also relate to a compatible application being run that is not the same as the application the lighting control data was created with, but replaces such an application. A second example of executing an application call comprises: determining that the application which the lighting control data was created with is not installed on the second computer device, and providing the identification data to an internet service for providing the second computer device remote access to a copy of the application which the lighting control data was created with. The internet service can run the application as a cloud based service for example, allowing the user to edit the lighting control data in a browser on the second computer device.

In a further embodiment of the method according to the first aspect, the method further comprises: receiving further lighting control data from an application running on a third computer device, the further lighting control data being the same as the lighting control data, and amending the data set based on the lighting control data stored in the node of the networked lighting system, such that the amended data set comprises further identification data of the application which the further lighting control data was created with.

This is especially beneficial as the same scene or rule can be used by multiple applications. For example, a rule can be set to trigger the arrival scene when the front door of a home is opened. A further rule can be set that sets the arrival scene to scene A when Amber arrives home and scene B when Bob arrives home. Both these users may have set these rules using different applications on their respective smart phones. However, the rule triggering the arrival scene is the same for both. The data set related to such a rule can then comprise two identifications of applications; one for the application Amber used and one for the application Bob used. Both these identifications could be passed on to (the application running on) the second computer device, wherein the second computer device is to determine which application to run (e.g. based on which application is present, or based on user identification data). As another example, a node in the networked lighting system can retrieve both identifications and determine which application should be run. As yet another example, a rule can be created by one application (e.g. defining a 'go to sleep' routine to be executed at a specific time) and amended by another application (e.g. causing the aforementioned 'go to sleep' routine to also be executed when a wearable device indicates a person is lying down).

In a second aspect, a computer program product is provided for performing the method according to the first aspect. The computer program product performs the method when run on a computer device. Such a computer program product can, for example, be downloaded to a smart phone.

In a third aspect, a node in a networked lighting system is provided. The node comprises an interface and a processor. The interface is arranged for receiving lighting control data from an application running on a first computer device. The processor is arranged for storing in one or more nodes of the networked lighting system a data set, the data set based on the lighting control data and comprising identification data of the application which the lighting control data was created with. The interface is further arranged for receiving from an application running on a second computer device an input indicating an editing of the lighting control data. The processor is further arranged for retrieving the identification data comprised in the data set which is based on the lighting control data, and for executing an application call over the interface based on the retrieved identification data, such that the second computer device runs the application which the lighting control data was created with.

In an embodiment of the node according to the third aspect, the processor is further arranged for determining that the application which the lighting control data was created with is not installed on the second computer device, and wherein the processor is further arranged for contacting an internet service and providing the identification data to the internet service. The internet service is arranged for providing the second computer device with remote access to the application which the lighting control data was created with, or wherein the internet service is arranged for providing a download location of a copy of the application which the lighting control data was created with.

In a fourth aspect, a system is provided comprising a node according to the third aspect. The system further comprises the server for providing the internet service.

These and other aspects of the invention will be apparent from and elucidated with reference to the embodiments described hereinafter.

DETAILED DESCRIPTION OF EMBODIMENTS

Figure 1:
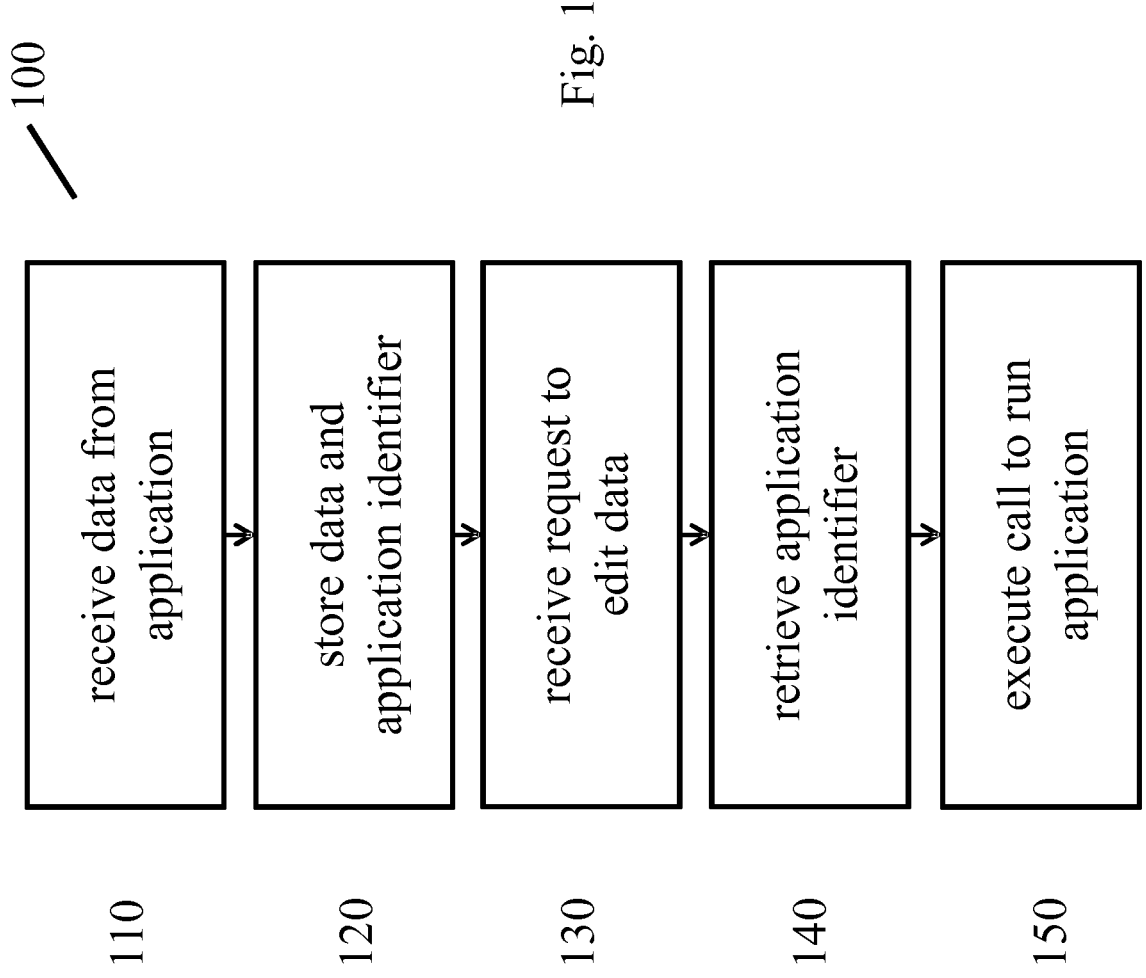
FIG. 1 shows schematically and exemplarily a computer implemented method for controlling, based on lighting control data, a networked lighting system.

In FIG. 1 an embodiment of a computer implemented method 100 for controlling, based on lighting control data, a networked lighting system is shown. The method comprises:
receiving 110 the lighting control data from an application running on a first computer device,
storing 120 in a node of the networked lighting system a data set, the data set based on the lighting control data and comprising identification data identifying the application which the lighting control data was created with,
receiving 130 from an application running on a second computer device an input indicating an editing of the lighting control data,
retrieving 140 the identification data comprised in the data set which is based on the lighting control data, and
executing 150 an application call based on the retrieved identification data, such that the second computer device runs the application which the lighting control data was created with.

Figure 2:
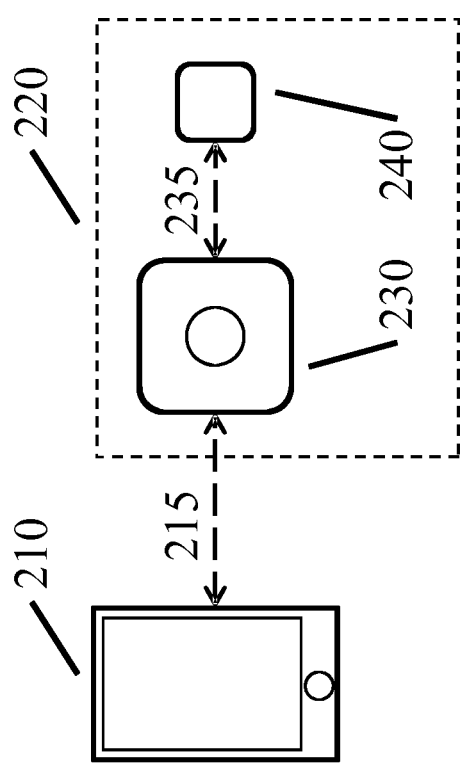
FIG. 2 shows schematically and exemplarily a networked lighting system.

In FIG. 2 an example of a networked lighting system 220 is shown. Further, as an example of a computer device, a smart phone 210 is shown. Other examples of computer devices include, but are not limited to, a wall panel, a desktop computer, a tablet computer, a laptop computer, and any other type of computer device capable of running software. The networked lighting system in this example comprises two nodes 230, 240. A bridge node 230 operates as a central controller in the networked lighting system 220. A lighting node 240 is capable of emitting light output, for example in various colors or at different intensities. The smart phone 210 of this example can communicate with the bridge 230 over a wireless Ethernet connection 215. The bridge 230 and the lighting node 240 communicate over a ZigBee 235 connection. The method can be applied to any other networked lighting system capable of storing and making accessible a data set as described herein with.

Figure 3:
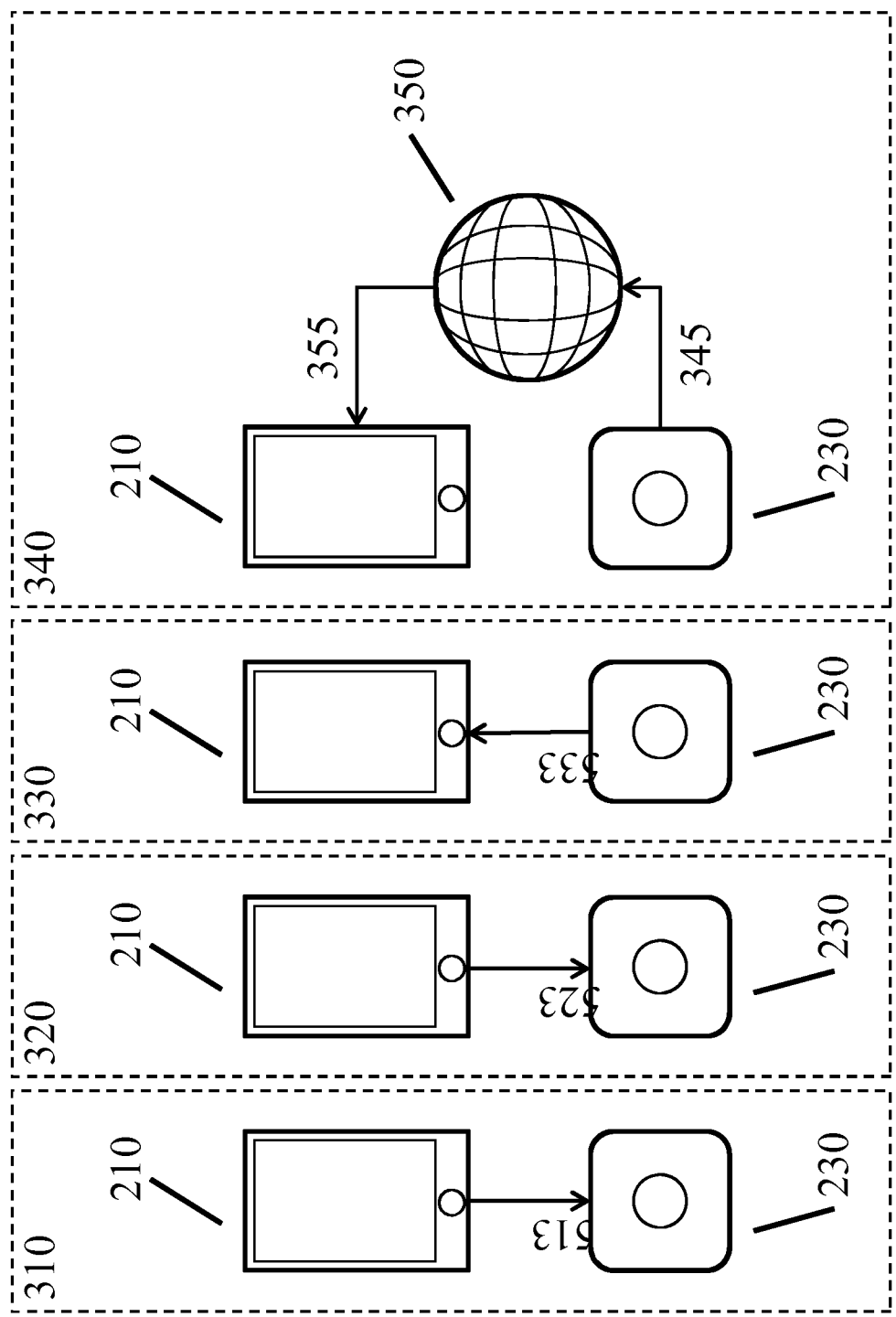
FIG. 3 shows schematically and exemplarily some interactions between a computer device and a node of a networked lighting system according to the method shown in FIG. 1.

In FIG. 3 certain interactions between a computer device and a node of a networked lighting system are shown. This further explains the method illustrated in FIG. 1 and some further embodiments of such a method. Shown are four steps 310, 320, 330, 340, the last of which is optional.

In a first step 310, a smart phone 210, as an example of a first computer device running an application, sends lighting control data 315 over a link to a bridge 230 of a networked lighting system. For example, in the first step 310 a scene may be set by a user running an application on a smart phone 210. Alongside the data related to the scene, an identification is stored identifying the application which was used by the user to create the scene. This data can be provided by the application as part of the lighting control data 315 sent to the bridge 230, or can be requested by the bridge separately, as some examples of implementations that can be realized to achieve such interaction.

In a second step 320, a user (the same user or a different user) uses a smart phone 210 (the same smart phone or a different one) using an application (the same application that was used to create the scene or a different one) to indicate that the scene is to be changed. This indication 325 can comprise selecting a scene out of one or more scenes stored on the bridge 230.

In a third step 330, the bridge 230 retrieves the identification stored with the lighting control data that is to be amended. The bridge 230 then calls 335 the application that was used to create the scene on the smart phone 210. If the application is present on the smart phone, the user can edit the scene using the same application that was used to create the scene.

Optionally, in a fourth step 340 it is determined that the application that was used to create the scene is not installed on the smart phone 340. This determination can be made by the smart phone 210 providing back an error message to the bridge 230 based on the call 335 to the application, or, as a further example, by the bridge 230 not receiving an acknowledgement that the application was launched. The bridge 230 then forwards 345 the identification of the application to an internet service 350 that sends a message 355 to the smart phone 210 causing the application to be downloaded. In other implementations, the smart phone 210 directly accesses the internet service 350 to download the application if it is not present on the smart phone 210 upon determining the application not being installed, or the bridge 230 forwards a link to the download location to the smart phone 210.

In this example a bridge 230 is shown. A similar example can be made with a different node in the networked lighting system, such as a lighting node, a hub, a controller node, etc. The node receiving the lighting control data can store the data set locally or in another node in the networked lighting system.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. The reference to first data, second data, third data, etc. does not indicate any order or relationship between such data. Any reference signs in the claims should not be construed as limiting the scope.

The invention claimed is:

1. A computer implemented method for controlling a networked lighting system based on lighting control data, the method comprising:

receiving lighting control data from a first application running on a first computer device, storing a data set in a lighting node of the networked lighting system, the data set based on the lighting control data and comprising identification data identifying the first application, receiving, at the lighting node, an input indicating an editing of the lighting control data from a second application running on a second computer device, retrieving from the lighting node the identification data comprised in the data set which is based on the lighting control data, and executing an application call based on the retrieved identification data causing the second computer device to run the first application.

2. The computer implemented method according to claim 1, wherein the method further comprises:

receiving further data from the first application from which the lighting control data is received, and providing to the second computer device the further data, causing the first application to provide a user interface based on the further data for editing the lighting control data, wherein the data set comprises the further data.

3. The computer implemented method according to claim 2, wherein the lighting control data comprises a color setting and/or an intensity setting for controlling a light output of a networked lighting device, the setting acquired from an image, and wherein the further data comprises a reference to the image or wherein the further data comprises the image.

4. The computer implemented method according to claim 3, wherein the further data further comprises at least one position in the image from which the setting was acquired.

5. The computer implemented method according to claim 1, wherein the lighting control data comprises a rule for controlling a light output of a networked lighting device, the rule based on a template, and wherein the further data comprises a reference to the template or wherein the further data comprises the template.

6. The computer implemented method according to claim 5, wherein the rule comprises multiple rule elements and wherein the further data further comprises a mapping of at least some of the multiple rule elements to the template.

7. The computer implemented method according to claim 1, wherein executing an application call comprises one of:
the second application calling the first application on the second computer device based on the identification data, or
a node in the networked lighting system calling the first application on the second computer device based on the identification data.

8. The computer implemented method according to claim 1, wherein executing the application call further comprises:
determining that the first application is not installed on the second computer device, and
controlling the second computer device to download a copy of the first application.

9. The computer implemented method according to claim 8, wherein executing the application call further comprises:
providing the identification data to an internet service to determine a download location of the copy of the first application.

10. The computer implemented method according to claim 1, wherein executing an application call further comprises:
determining that the first application is not installed on the second computer device, and providing the identification data to an internet service for providing the second computer device remote access to a copy of the first application.

11. The computer implemented method according to claim 1, wherein the method further comprises:
receiving further lighting control data from a third application running on a third computer device, the further lighting control data being the same as the lighting control data, and
amending the data set based on the lighting control data stored in the node of the networked lighting system, causing the amended data set to comprise further identification data of the third application.

12. A computer program product arranged for performing the method according to claim 1 when run on a computer device.

13. A lighting node in a networked lighting system, the node comprising:
an interface arranged for receiving lighting control data from a first application running on a first computer device, and
a processor arranged for storing in one or more lighting nodes of the networked lighting system a data set, the data set based on the lighting control data and comprising identification data of the first application,
wherein the interface is further arranged for receiving from a second application running on a second computer device an input indicating an editing of the lighting control data,
wherein the processor is further arranged for retrieving the identification data comprised in the data set which is based on the lighting control data, and for executing an application call over the interface based on the retrieved identification data, causing the second computer device to run the first application.

14. The node according to claim 13, wherein the processor is further arranged for determining that the first application which the lighting control data was created with is not installed on the second computer device, and wherein the processor is further arranged for contacting an internet service and providing the identification data to the internet service,
wherein the internet service is arranged for providing the second computer device with remote access to the first application, or wherein the internet service is arranged for providing a download location of a copy of the first application.

15. A system comprising a node according to claim 14, the system further comprising a server for providing the internet service.

16. The computer implemented method according to claim 1, wherein said retrieving and said executing are performed in response to said receiving from the first application running on the second computer device the input indicating the editing of the lighting control data.

17. The node according to claim 13, wherein the processor is configured to perform said retrieving and said executing in response to said receiving from the first application running on the second computer device the input indicating the editing of the lighting control data.

18. The method according to claim 1, wherein the data set comprises identification data identifying the first application.

19. The method according to claim 18, wherein identification data identifying the first application comprises either a name of the application, a link to an online location of the application, or a number identifying the application.

20. The method according to claim 1, wherein the application call comprises the step of performing an application programming interface call to an application programming interface running on a node.

* * * * *